May 25, 1965 W. F. MENGEL 3,185,109
VEHICLE TURNTABLE
Filed June 27, 1963
2 Sheets-Sheet 2
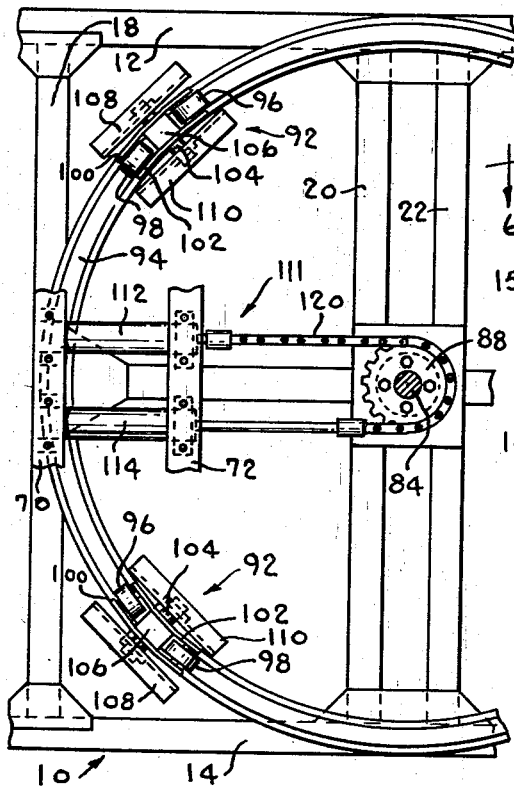
FIG. 4
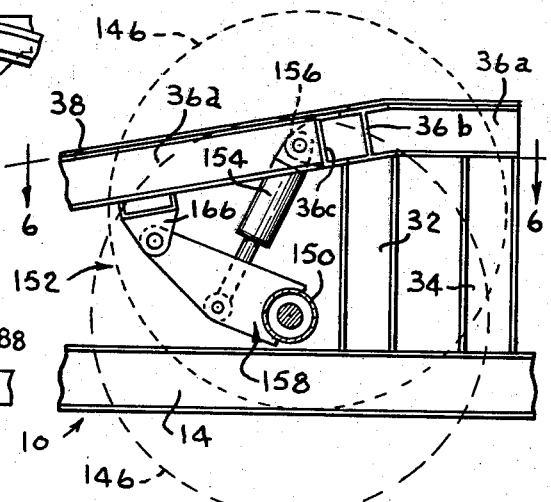
FIG. 5
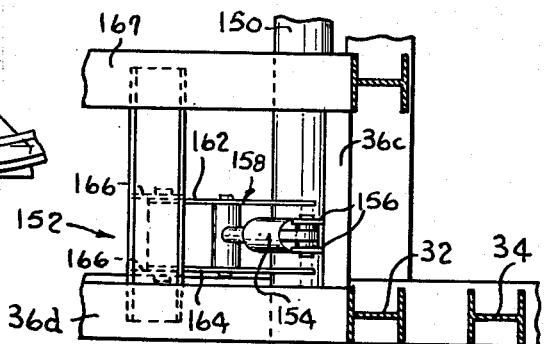
FIG. 6
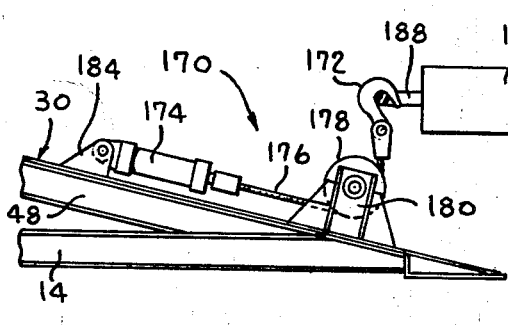
FIG. 7
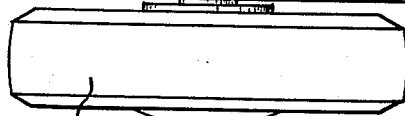
INVENTOR.
WILLIAM F. MENGEL
BY John W. Michael
ATTORNEY United States Patent Office 3,185,109
Patented May 25, 1965

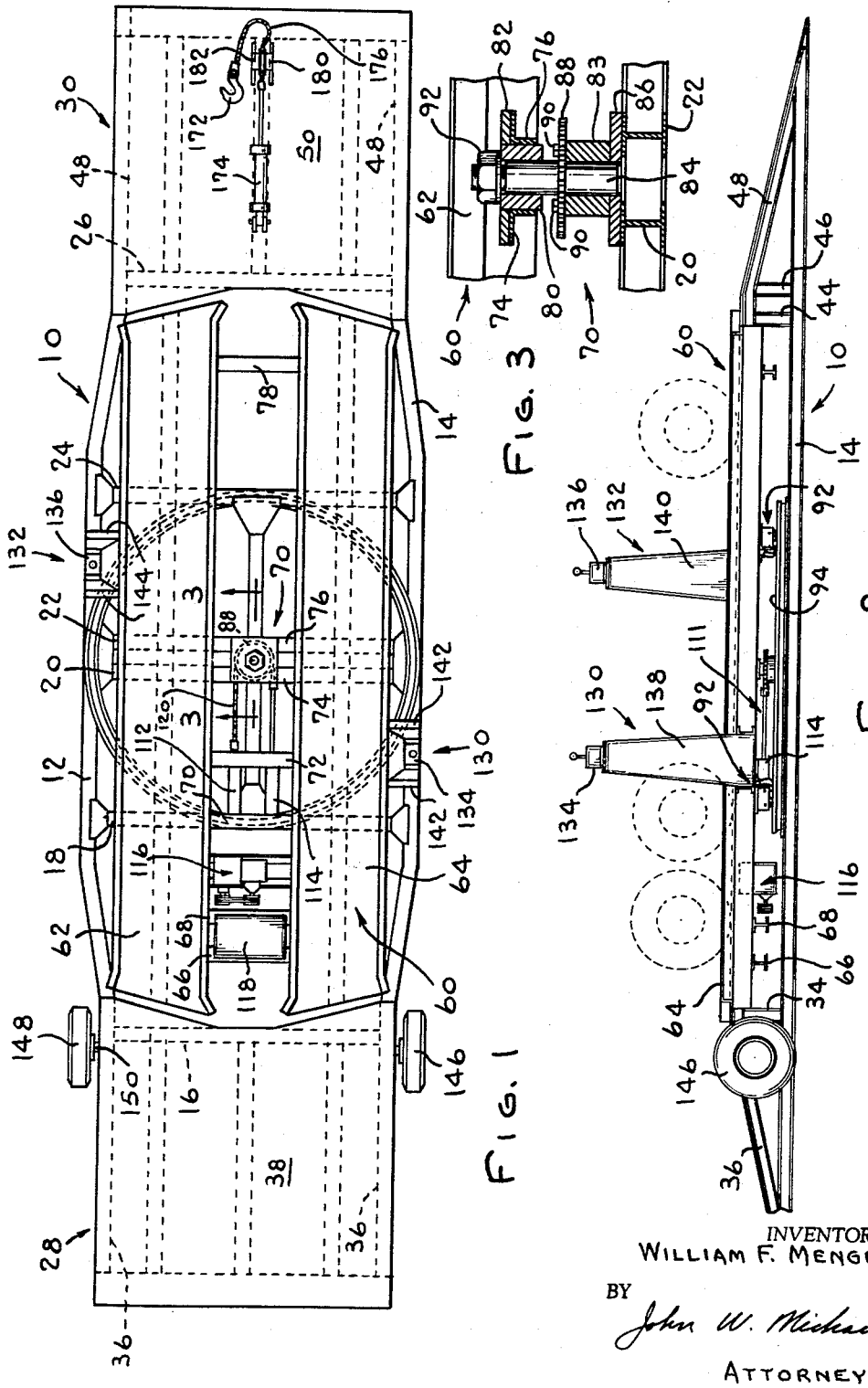

3,185,109
VEHICLE TURNTABLE
William F. Mengel, % F. F. Mengel Co.,
Wisconsin Rapids, Wis.
Filed June 27, 1963, Ser. No. 291,206
16 Claims. (Cl. 104—45)

This invention relates to vehicle turntables.

Although not limited to any particular usage, the turntable of this invention will probably find its widest application in the construction field. In many instances, a construction site is so confining that it does not provide sufficient area in which to turn around the various types of construction vehicles which may be used. For example in highway paving a truck delivering material to the road site may be required to proceed in the area between the roadway forms, which area is not sufficiently wide to permit the truck to turn around. Thus, the truck must make one leg of its travel in reverse which is a slow and, in some instances, a difficult procedure depending upon the load carried and the vehicle involved.

An object of this invention is to provide improved apparatus for turning a vehicle operating in a confined space.

Another object of this invention is to provide a portable vehicle turntable; and, moreover, to do so while maintaining optimum capacity.

A further object of this invention is to provide a simple, self-contained and compact portable turntable.

Still a further object of this invention is to provide a vehicle turntable which requires no personnel other than the operator of the vehicle on the turntable to control its operation.

For the achievement of these and other objects, this invention contemplates the provision of a turntable which is supported on and rotatable relative to a structural frame. Rotation of the turntable on the frame is controlled by means which is supported and arranged so as to be accessible from a vehicle positioned on the turntable. The frame can be raised and lowered for selectively seating it on the ground for turn-table operation or for raising it for transportation to another site. Preferably, the raising and lowering of the frame is accomplished by retractable wheels which are supported on and for vertical movement relative to the frame to thereby provide both means for raising and lowering the frame and also for transporting the turntable from one site to another. In the more specific aspects of this invention, the retractable wheels are provided adjacent only one end of the turntable and a hitch mechanism is also provided on the turntable. The hitch mechanism is arranged for connection to a draft vehicle and, when so connected, is operative to complete the raising of the frame for transportation on the retractable wheels.

Other objects and advantages will be pointed out in, or be apparent from, the specification and claims, as will obvious modifications of the embodiment shown in the drawings, in which:

FIG. 1 is a top plan view of a preferred embodiment of this invention;

FIG. 2 is a side elevation thereof;

FIG. 3 is a section view taken generally along lines 3—3 of FIG. 1;

FIG. 4 is a top plan view of a part of the support and drive means for the turntable;

FIG. 5 is a side elevation of the wheel retracting mechanism;

FIG. 6 is a view taken generally along lines 6—6 of FIG. 5; and

FIG. 7 is a side elevation of the hitch means illustrating its connection to a draft vehicle.

With particular reference to the drawings, the turntable constructed in accordance with this invention includes a structural frame 10 comprising elongated side structural members 12 and 14 connected by transversely extending structural members 16, 18, 20, 22, 24 and 26 and access ramps 28 and 30 provided at the opposed ends of the frame. Ramp 28 is formed by a pair of supports 32 and 34 (see FIG. 5) connected to and extending upwardly from both of the side structural members 12 and 14, only those connected to side member 14 being illustrated in the drawing. A support member 36 is connected to each pair of the upright members 32 and 34 and is bent downwardly toward side structural members 12 and 14 for connection thereto. A rigid plate 38 is connected to the upper side of support members 36 to provide a sloping ramp over which vehicles have access to the turntable from one end thereof. Similarly ramp 30 provides access to the turntable from the opposite end thereof and includes a pair of supports 44 and 46 extending upwardly from side members 12 and 14, a support member 48 connected to each pair of supports 44 and 46 and extending downwardly toward side structural members 12 and 14 with a rigid plate 50 attached thereto to complete the access.

A turntable 60 is supported on frame 10 intermediate access ramps 28 and 30 and is connected for rotational movement in a horizontal plane by means 70. Structurally turntable 60 includes generally channel shaped tracks 62 and 64 connected by transverse structural members 66, 68, 70, 72, 74, 76 and 78, members 74 and 76 also forming a structural part of means 70. Turning now to means 70 and particularly FIG. 3, a bearing 80 is connected to a plate 82 which is in turn connected to structural members 74 and 76. A pin 84 is positioned in bearing 80 and extends downwardly into bearing 83 which is fixed on plate 86 connected to frame structural members 20 and 22. A sprocket 88 is fixed on pin 84 and is in turn anchored to bearing 83 by bolts 90. With this arrangement, pin 84 defines a fixed, vertical axis about which the turntable can rotate. Nut 92 is threaded onto pin 84 to prevent relative vertical movement between the pin and turntable.

The actual vertical support of turntable 60 in the frame is provided by a plurality of dollies 92 connected to the turntable and arranged to engage a circular track 94 in the frame. The dollies 92 are of identical construction and each includes a pair of wheels 96 and 98 rotatably supported between opposed plates 100 and 102. A pin 104 is journalled in a bearing 106 fixed between plates 100 and 102 and engages angle brackets 108 and 110 which are in turn connected to the underside of respective ones of the tracks 62 or 64. Two of the dollies are connected to each of the tracks 62 and 64 and engage the circular track 94 to vertically support the turntable for rotation about fixed pin 84. Moreover, the dolly construction described above provides somewhat of a floating connection for the turntable in that pins 104 allow for limited motion between the turntable and the rollers to accommodate minor misalignment and movement of the turntable relative to the frame which may occur in operation.

Rotation of turntable 60 is accomplished through a drive mechanism 111 which includes a pair of hydraulic rams 112 and 114 supported from structural members 70 and 72 and connected to opposite ends of a chain 120 which is engaged with fixed sprocket 88. The hydraulic rams are connected to and activated from a hydraulic motor and pump arrangement 116 in a manner well known in the art. A tank 118 supported from structural members 66 and 68 stores the hydraulic fluid for the turntable drive. Alternate actuation of hydraulic rams 112 and 114 pulls the turntable around sprocket 88 causing the turntable to rotate about pin 84. More particularly and as illustrated in FIGS. 1 and 4, actuation of hydraulic ram 114 will rotate the turntable counterclockwise, whereas subsequent actuation of hydraulic ram 112 will rotate the turntable clockwise. The hydraulic rams, chain and sprocket are selected so that the maximum rotation of the turntable in both directions is limited to 180° and at the extreme of travel in either direction the tracks 62 and 64 will be aligned with the access ramps.

It will be noted that the rams, the hydraulic drive therefor and the storage tank are supported on and movable with the turntable, this provides a completely self-contained and compact construction and simplifies the drive connections.

Actuation of drive 111 to operate the hydraulic rams is controlled from stations 130 or 132 which include suitable control valves 134 and 136 mounted on support structures 138 and 140. The support structures are connected on opposed sides of and spaced longitudinally on the turntable by channel members 142—142 and 144—144, and valves 134 and 136 are connected to drive 111 in a manner well known in the art. With this arrangement a truck, or other vehicle, can be driven onto the turntable and the operator of the truck has access to either one or the other of the control valves 134 and 136. The operator can then actuate the drive mechanism to rotate the turntable through 180° and position his truck as desired. Again it should be noted that the control stations 130 and 132 are supported on and movable with the turntable to maintain the compact and relatively simplified construction.

The turntable incorporating this invention is also preferably constructed so as to be completely portable and to this end a pair of retractable wheels 146 and 148 are supported from the frame 10. More particularly, wheels 146 and 148 are connected by a single axle 150 and retracting mechanisms 152 are provided at each wheel for selectively raising and lowering the wheels with respect to frame 10 (only one of the wheels being illustrated in FIGS. 5 and 6). The retracting mechanisms 152 include a hydraulic ram 154 having one end connected to a bracket 156 and having its other end connected to a lever arm 158. At this point it will be noted that the support members 36 are not continuous but are fabricated members comprising a short structural section 36a, an I-beam section 36b, a channel section 36c and an elongated structural section 36d which extends to the side members 12 and 14. Bracket 156 is connected to channel section 36c and lever arm 158 comprises relatively spaced plates 162 and 164 having one end fixed to shaft 150 and having its other end pivotally connected to a mounting bracket 166 extending between structural section 36d and a second section 167 which extends from I-beam section 36b (the actual connection not shown). Accordingly, actuation of hydraulic ram 154 will pivot plates 162 and 164 about bracket 166 and will alternately raise or lower the wheels 146 and 148 as desired. As the wheels are raised into the frame the frame is lowered onto the ground and conversely when the wheels are lowered for engagement with the ground the frame is raised. With this arrangement the frame can be securely seated for operation of the turntable or can alternately be raised to transport the turntable from one point to another on a particular job site. Furthermore, with this arrangement, when the turntable is in operation, the wheels do not carry the load, the load is carried by the frame which considerably increases the capacity of the turntable while maintaining a relatively simplified structure.

It will be noted that the wheels 146 and 148 are provided adjacent only one end of the turntable and, to complete the portable feature of the construction, hitch mechanism 170 is provided on the frame adjacent the opposite end of the turntable, in this instance the hitch mechanism is mounted on the access ramp 30. The hitch mechanism comprises a hook 172 connected to a hydraulic ram 174 by a flexible cable 176. The flexible cable is reeved over a pulley or sheave 178 which is rotatably supported between brackets 180 and 182. The hydraulic ram is anchored by a bracket 184 and upon actuation of the hydraulic ram the hook will either be let out or retracted relative to the hydraulic ram. In operation the hook can be attached to a draft vehicle 186, for example by engagement with a bracket 188 on the frame 190 of the vehicle. When the hook is so engaged, hydraulic ram 174 is actuated to retract flexible cable 176. This action raises the right end (as viewed in the drawings) of the turntable and the draft vehicle can then pull the turntable to any desired location.

In operation the turntable is positioned as desired at a particular job site and a vehicle can be driven onto the turntable and rotated 180° to properly position the vehicle for unloading. After the vehicle is unloaded it is properly directed for a rapid exit from the work site. It will be appreciated that, if desired, the turntable can be positioned at any desired point between its extreme ends of travel to correspondingly position the vehicle. Should the turntable have to be moved wheels 146 and 148 are lowered and a hitch mechanism 170 is connected to a draft vehicle, the hitch means is then actuated to raise the end of the turntable. The turntable can then be moved as desired.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. Apparatus comprising, in combination, an elongated frame, a turntable, means supporting said turntable on said frame for movement about a generally vertical axis, retractable wheels supported on said frame to provide means for transporting said apparatus, means for vertically moving said wheels to selectively raise and lower said frame so that said frame can be seated on the ground for operation of said turntable and raised from the ground for transportation on said wheels, drive means for rotating said turntable about said vertical axis, and hitch means on said apparatus for connection externally of said apparatus and operative, when so connected, to raise a portion of said frame for transportation.

2. The apparatus of claim 1 including control means for said drive means supported in said apparatus for access from a vehicle on said turntable.

3. Apparatus comprising, in combination, a vehicle turntable, means supporting said turntable for movement about a generally vertical axis, retractable wheels connected to said support means, means for moving said wheels vertically to selectively raise and lower said support means and said turntable so that said apparatus can be seated on the ground for operation of said turntable and raised from the ground for transportation on said wheels, drive means for rotating said turntable about said axis, and hitch means arranged in said apparatus in spaced relationship from said wheels and including a hitch member adapted for connection to a draft vehicle and connected to means for moving said hitch means relative to said frame to selectively raise and lower at least a portion of said frame for transportation.

4. The apparatus of claim 3 including control means for said drive means supported on bracket means connected to and extending upwardly from said turntable so that access to said control means can be had from a vehicle positioned on said turntable.

5. The apparatus of claim 4 wherein said control means includes first and second control members positioned on opposed sides of said turntable for access from either side of said turntable and each connected to and controlling said drive means.

6. Apparatus comprising, in combination, an elongated frame having angularly disposed access ramps at the opposite longitudinal ends thereof, a vehicle turntable, means supporting said turntable intermediate said access ramps and for movement relative thereto about a generally vertical axis, retractable wheels supported on said frame, means for vertically moving said wheels to selectively raise and lower said frame so that said frame can be seated on the ground for operation of said turntable and raised from the ground for transportation on said wheels, drive means for rotating said turntable about said vertical axis, control means for said drive means supported and arranged in said apparatus for access from said turntable, and hitch means on said apparatus for connection to a draft vehicle and operative, when so connected, to raise a portion of said frame for transportation.

7. The combination of claim 6 wherein said control means includes first and second control members connected to and controlling said drive means, said control members supported one on one side of and the other on an opposite side of said turntable and extending upwardly therefrom for access from either side of said turntable.

8. The apparatus of claim 7 wherein said hitch means is connected on at least one of said access ramps and includes a hitch member adapted for connection to a draft vehicle and connected to means for moving said hitch member relative to said apparatus to selectively raise and lower said portion of said frame when said hitch member is connected to said draft vehicle.

9. The apparatus of claim 6 wherein said support means for said turntable comprises a generally circular track on said frame and a plurality of carriage members supported from said turntable and engaged with said track means for vertically supporting said turntable.

10. Apparatus comprising, in combination, an elongated frame, a turntable, means supporting said turntable on said frame for movement in a generally horizontal plane, retractable wheels supported on said frame to provide means for transportating said apparatus, means for vertically moving said wheels to selectively raise and lower said frame so that said frame can be seated on the ground for operation of said turntable and raised from the ground for transportation on said wheels, means for moving said turntable in said horizontal plane, control means positioned on each of the longitudinally opposite sides of said turntable and arranged for access from either side of said turntable and each control means connected to and controlling said moving means, and hitch means arranged on said apparatus in spaced relationship from said wheels for connection to a draft vehicle and operative, when so connected, to raise a portion of said frame for transportation.

11. Apparatus comprising, in combination, a turntable, means supporting said turntable for movement about a generally vertical axis, retractable wheels connected to said support means, means for vertically moving said wheels to selectively raise and lower said support means and said turntable so that said apparatus can be seated on the ground for operation of said turntable and raised from the ground for transportation, means for rotating said turntable about said vertical axis including first and second driving members and drive means, said drive means supported on and movable with said turntable and one of said driving members fixed on said support means and the other of said driving members connected to said drive means and supported for movement with said turntable, said means for rotating said turntable also including means operatively connecting said first and second driving members so that driven movement of said other driving member is translated into rotation of said turntable, control means for said drive means supported on said turntable for access from either side of said turntable, and hitch means arranged on said support means for connection to a draft vehicle and operative, when so connected, to raise at least a portion of said apparatus for transportation.

12. Apparatus comprising, in combination, an elongated frame, an access ramp at one of the longitudinal ends of said frame, a generally elongated vehicle turntable, means supporting said turntable on said frame for access from said access ramp and for movement relative to said frame about a vertical axis, said turntable normally assuming a position with its longitudinal axis extending parallel to the longitudinal axis of said frame and in alignment with said access ramp, drive means on said apparatus and connected between said frame and turntable for rotating said turntable about said vertical axis, said drive means having a preset cycle of operation effective to rotate said turntable through a limited arc of 180° each time said drive means is energized so that said turntable is displaced from said normal position upon energization of said drive and rotates 180° to re-assume a position with its longitudinal axis parallel to the longitudinal axis of said frame and aligned with said access ramp, retractable wheels, and means connected between said wheels and frame for providing relative movement between said frame and wheels to selectively retract said wheels into said frame and seat said frame on the ground and extend said wheels from said frame to raise said frame for transportation of said apparatus.

13. The apparatus of claim 12 including control means for said drive means arranged in said apparatus for access from either side of said turntable.

14. The apparatus of claim 13 including hitch means on said apparatus for connecting said apparatus to a draft vehicle for transportation.

15. The apparatus of claim 14 wherein said means for rotating said turntable comprises a sprocket fixed to one of said turntable and frame, operating means having an operating stroke of preset length connected to the other of said frame and turntable, and chain means connected between said sprocket and said operating means for transmitting said stroke movement to said turntable for rotation of said turntable, said chain and stroke being of predetermined length sufficient to rotate said turntable through said 180° arc each time said operating means is activated.

16. The apparatus of claim 15 including an access ramp at the other longitudinal end of said frame with said turntable arranged intermediate said access ramps, and wherein said wheels and hitch means are relatively spaced along the longitudinal axis of said frame and said hitch means is operative to raise a portion of said frame when said hitch means is connected to said draft vehicle.

References Cited by the Examiner

UNITED STATES PATENTS

| | | | |
|---|---|---|---|
| 938,920 | 2/09 | Verplanck | 104—44 |
| 1,446,228 | 2/23 | Venable | 104—44 |
| 1,749,101 | 3/30 | Heltzel | 104—45 |
| 2,058,115 | 10/36 | Wheeler | 104—44 |
| 2,244,598 | 6/41 | Ash | 104—44 |

LEO QUACKENBUSH, *Primary Examiner.*